United States Patent
Xie et al.

(10) Patent No.: US 10,333,845 B2
(45) Date of Patent: Jun. 25, 2019

(54) FORWARDING DATA PACKETS

(71) Applicant: New H3C Technologies Co., Ltd., Zhejiang (CN)

(72) Inventors: Ruitao Xie, Beijing (CN); Xiangqiao Ao, Beijing (CN); Peng Fei, Beijing (CN)

(73) Assignee: NEW H3C TECHNOLOGIES CO., LTD, Hangzhou (CN)

( * ) Notice: Subject to any disclaimer, the term of this patent is extended or adjusted under 35 U.S.C. 154(b) by 63 days.

(21) Appl. No.: 15/570,919

(22) PCT Filed: Jun. 6, 2016

(86) PCT No.: PCT/CN2016/084884
§ 371 (c)(1),
(2) Date: Oct. 31, 2017

(87) PCT Pub. No.: WO2016/192686
PCT Pub. Date: Dec. 8, 2016

(65) Prior Publication Data
US 2018/0287942 A1  Oct. 4, 2018

(30) Foreign Application Priority Data
Jun. 4, 2015 (CN) .......................... 2015 1 0304025

(51) Int. Cl.
*H04L 12/741* (2013.01)
*H04L 12/46* (2006.01)
(Continued)

(52) U.S. Cl.
CPC ........ *H04L 45/745* (2013.01); *H04L 12/4633* (2013.01); *H04L 12/4641* (2013.01);
(Continued)

(58) Field of Classification Search
CPC ............... H04L 45/745; H04L 12/4641; H04L 12/4633; H04L 45/74; H04L 49/70; H04L 12/66
See application file for complete search history.

(56) References Cited

U.S. PATENT DOCUMENTS

2013/0266015 A1  10/2013  Qu et al.
2013/0318219 A1  11/2013  Kancherla
(Continued)

FOREIGN PATENT DOCUMENTS

CN  101827038 A  9/2010
CN  102571587    7/2012
(Continued)

OTHER PUBLICATIONS

David C. Plummer, RFC 826 An Ethernet Address Resolution Protocol, Nov. 1982, [retrieved on Mar. 20, 2019]. Retrieved from the Internet: <URL: https://tools.ietf.org/html/rfc826> (Year: 1982).*
(Continued)

*Primary Examiner* — Omar J Ghowrwal
(74) *Attorney, Agent, or Firm* — McCarter & English, LLP; Kia L. Freeman; Thomas F. Foley (57) ABSTRACT

A line card of a virtual extensible local area network (VXLAN) gateway receives a data packet, determines to perform a layer-three forwarding to the data packet, takes a fabric board of a category as a destination fabric board, which matches with a value of a set bit position of a destination internet protocol (IP) address of the data packet, and transmits the data packet to the destination fabric board. Subsequently, after receiving the data packet, when determining to perform the layer-three forwarding to the data packet, the destination fabric board searches in address resolution protocol (ARP) entries stored therein for an ARP entry, which matches with the destination IP address of the data packet, and cooperates with a first destination line card
(Continued)

associated with the output port in the ARP entry searched out to forward the data packet.

10 Claims, 6 Drawing Sheets

(51) Int. Cl.
*H04L 12/931* (2013.01)
*H04L 12/66* (2006.01)
(52) U.S. Cl.
CPC .............. *H04L 12/66* (2013.01); *H04L 45/74* (2013.01); *H04L 49/70* (2013.01)

(56) References Cited

U.S. PATENT DOCUMENTS

2015/0358232 A1* 12/2015 Chen ...................... H04L 45/72
370/392
2018/0351879 A1* 12/2018 Zhang .................. H04L 49/201

FOREIGN PATENT DOCUMENTS

| CN | 103797774 | 5/2014 |
| CN | 103825976 | 5/2014 |
| CN | 104283980 A | 1/2015 |
| CN | 104350714 A | 2/2015 |
| CN | 104639440 | 5/2015 |
| WO | 2014/028094 A1 | 2/2014 |

OTHER PUBLICATIONS

RFC 7348 Virtual eXtensible Local Area Network (VXLAN): A Framework for Overlaying Virtualized Layer 2 Networks over Layer 3 Networks, Aug. 2014, [retrived on Mar. 20, 2019]. Retrieved from the Internet: <URL: https://datatracker.ietf.org/doc/rfc7348/> (Year : 2014).*

Information Sciences Institute, RFC 791 Internet Protocol, Sep. 1981, [retrieved on Mar. 20, 2019]. Retrieved from the Internet: <URL: https://tools.ietf.org/html/rfc791> (Year: 1981).*

Gupta et al. Media Access Control (MAC), Nov. 2009, Academy Publisher, International Journal of Recent Trends in Engineering, vol. 2, No. 4, [retrieved on Mar. 20, 2019] Retreived from Internet<URL: http://citeseerx.ist.psu.edu/viewdoc/download?doi=10.1.1.375.1110&rep=rep1&type=pdf> (Year: 2009).*

International Search Report issued in PCT/CN2016/084884, dated Sep. 1, 2016 (4 pages).

* cited by examiner

FORWARDING DATA PACKETS

BACKGROUND

In data center applications, when providing layer-three services for a virtual machine (VM) in a virtual extensible local area network (VXLAN) network, a layer-three VXLAN gateway may be deployed in the VXLAN network. Layer-three gateway functions of the VXLAN gateway may enable a VM in the VXLAN network to perform a layer-three communication with a device in an exterior network, and enable the VM within the VXLAN network to perform the layer-three communication with another VM in an exterior VXLAN network.

DETAILED DESCRIPTIONS

To implement layer-three gateway functions of the layer-three VXLAN gateway, address resolution protocol (ARP) entries may be globally stored by an interface broad and a fabric board of the layer-three VXLAN gateway. One ARP entry may demonstrate one VM. In a large-scale data center application, there are a huge number of VMs. Subsequently, there are also a huge number of ARP entries. However, hardware resources of line cards and fabric boards in a layer-three VXLAN gateway are limited. In addition to ARP entries, media access control (MAC) entries, routing entries, VXLAN encapsulation entries and VXLAN decapsulation entries may also be stored. Subsequently, the huge number of ARP entries may not be maintained by the limited hardware resources, which may also affect data packet forwarding with the layer-three VXLAN gateway. In the present disclosure, to avoid defects that the ARP entries may not be maintained by the limited hardware resources, the following limitations may be made to the line card and fabric board of the layer-three VXLAN gateway.

1) Divide the fabric boards of the layer-three VXLAN gateway into N categories. N is greater than 1. Fabric boards in a same category may store the same ARP entries. Fabric boards in different categories may store different ARP entries.

The ARP entries, which are learned by the line card based on a similar ARP entry learning mode and stored by a fabric board in each category, may be differentiated and issued by a master board of the layer-three VXLAN gateway to fabric boards of each category. Differences among ARP entries are demonstrated by different values of a set bit position in a destination IP address of each ARP entry. It should be noted that, to ensure redundancy of ARP entries in a fabric board, there may be at least two fabric boards in each category.

In the present disclosure, number M of bits in foregoing set bit position may be determined by N, which may be further determined by the following formula: $2^M \geq N$. The specific positions of M bits may be configured in advance, which will not be limited by the present disclosure.

In the present disclosure, number of ARP entries stored by fabric board in each category may be not consistent. In the following example, number of ARP entries stored by first-category fabric boards may be greater than that respectively stored by second-category fabric boards and third-category fabric boards.

Three examples will be provided in the following, which describe how to divide fabric boards of layer-three VXLAN gateway into N categories. N is greater than 1. Fabric boards in the same category may store the same ARP entries. Fabric boards in different categories may store different ARP entries.

In an example, divide fabric boards of the layer-three VXLAN gateway into two categories. That is, foregoing N=2. The divided fabric boards in the two categories may be respectively referred to as first-category fabric board and second-category fabric board.

In the example, the first-category fabric board may store first-category ARP entries. The second-category fabric board may store second-category ARP entries. Value of the set bit position in the destination IP address of the first-category ARP entry is an odd number. Value of the set bit position in the destination IP address of the second-category ARP entry is an even number.

In the example, to differentiate ARP entries in the two categories, the set bit position may include 1 bit based on foregoing formula. The one bit may be any bit, such as the first bit, or the last bit. When the set bit position is the last bit, if value of the last bit in the destination IP address of an ARP entry is an odd number (e.g., value is 1), take such ARP entry as the first-category ARP entry. If value of the last bit in the destination IP address of an ARP entry is an even number (e.g., value is 0), take such ARP entry as the second-category ARP entry.

In another example, divide fabric boards of the layer-three VXLAN gateway into three categories. That is, foregoing N=3. The divided fabric boards in the three categories may be respectively referred to as first-category fabric boards, second-category fabric boards and third-category fabric boards.

In the example, the first-category fabric board may store first-category ARP entries. The second-category fabric board may store second-category ARP entries. The third-category fabric board may store third-category ARP entries.

In the example, to differentiate ARP entries of three categories, the set bit position may include 2 bits. The 2 bits may be any two continuous or discontinuous bits, e.g., the first two bits, or the last two bits, or the first bit and the last bit. When the set bit position includes the last two bits, if value of last two bits in the destination IP address of an ARP entry is 00 or 01, take such ARP entry as the first-category ARP entry. If value of last two bits in the destination IP address of an ARP entry is 10, take such ARP entry as the second-category ARP entry. If value of last two bits in the destination IP address of an ARP entry is 11, take such ARP entry as the third-category ARP entry.

In still another example, divide fabric boards of layer-three VXLAN gateway into $2^M$ categories. That is, foregoing N=$2^M$. M is greater than 2. The fabric boards divided in $2^M$ categories may be respectively referred to as first-category fabric board, second-category fabric board, until $2^M$-category fabric board.

In the example, the first-category fabric board may store first-category ARP entries. The second-category fabric board may store second-category ARP entries, and the like. The $2^M$-category fabric board may store $2^M$-category ARP entries.

In the example, to differentiate ARP entries of $2^M$ categories, the set bit position may include M bits based on foregoing formula. The M bits may be any continuous or discontinuous M bits, e.g., the first M bits, or the last M bits, or the first M/2 bits and the last M/2 bits, and so on. When the set bit position includes the last M bits, if value of each of the last M bits of the destination IP address in an ARP entry is 0, take such ARP entry as the first-category ARP entry. If value of one bit of the last M bits of the destination IP address in an ARP entry is 1, while values of the remaining (M−1) bits of the destination IP address in the ARP entry are 0, take such ARP entry as the second-category ARP entry, and the like. If value of each of the last M bits in the destination IP address of an ARP entry is 1, take such ARP entry as $2^M$-category ARP entry.

2) The fabric boards in each category of the layer-three VXLAN gateway may store the same routing entries.

The number of routing entries may be not so huge. Subsequently, the routing entries may not be separated and distributed to fabric boards in each category. The fabric boards of each category may store the complete and same routing entries.

In an example of the present disclosure, limitations may be made to routing entries stored by fabric boards in each category of the layer-three VXLAN gateway, such that an output port of a routing entry stored by fabric boards in each category of the layer-three VXLAN gateway may be a host accessed port.

3) The line card of the layer-three VXLAN gateway may store MAC entries, VXLAN encapsulation entries and VXLAN decapsulation entries, which may no longer store ARP entries and routing entries.

Based on foregoing limitations in the present disclosure, it can be seen that, the ARP entries are separately stored by fabric boards of the layer-three VXLAN gateway. Besides, in addition to storing a small number of routing entries, the fabric boards of layer-three VXLAN gateway may store ARP entries. Subsequently, even if there are a huge number of ARP entries, since there are no other excessive entries to compete hardware resources with ARP entries for maintenance, the defects that there is no hardware resource to maintain the ARP entries may not occur.

Based on foregoing limitations, descriptions will be given for the method provided by an example in the present disclosure.

Figure 1:
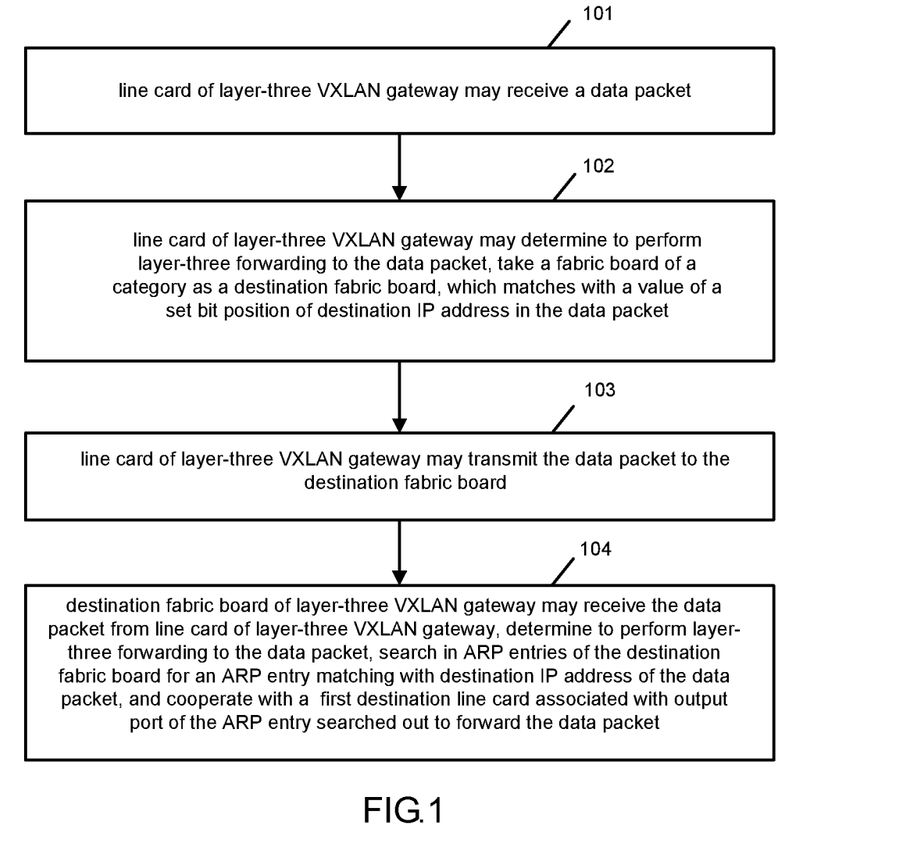
FIG. 1 is a method flowchart, in accordance with an example of the present disclosure.

With reference to FIG. 1, FIG. 1 is a method flowchart, in accordance with an example of the present disclosure. The flowchart may be applied to foregoing layer-three VXLAN gateway, which may include the following blocks.

In block 101, a line card of a layer-three VXLAN gateway may receive a data packet.

In block 101, when the line card of the layer-three VXLAN gateway receives the data packet, the following two cases may occur.

In a first case, the line card of the layer-three VXLAN gateway may receive a data packet without VXLAN encapsulation.

In a second case, the line card of the layer-three VXLAN gateway may receive a data packet with VXLAN encapsulation. In such case, the line card of the layer-three VXLAN gateway may perform a VXLAN decapsulation to the received data packet with VXLAN encapsulation. The VXLAN decapsulated data packet may refer to the data packet in the following.

Based on foregoing limited entries stored by line cards of the layer-three VXLAN gateway, the line cards of the layer-three VXLAN gateway may store the VXLAN decapsulation entries. Subsequently, in foregoing second case, the line card of layer-three VXLAN gateway may perform the VXLAN decapsulation to the received data packet with VXLAN encapsulation, based on VXLAN decapsulation entries stored by the line card of layer-three VXLAN gateway.

In block 102, the line card of the layer-three VXLAN gateway may determine to perform a layer-three forwarding for the data packet. If value of a set bit position of the destination IP address in the data packet matches with fabric boards in a category, the line card of the layer-three VXLAN gateway may take a fabric board in foregoing category as a destination fabric board.

The process for the line card of the layer-three VXLAN gateway to determine to perform the layer-three forwarding for the data packet may include as follows. Determine whether the destination MAC address of the data packet is the MAC address of the layer-three VXLAN gateway. If the destination MAC address of the data packet is the MAC address of the layer-three VXLAN gateway, determine to perform the layer-three forwarding for the data packet; otherwise, determine not to perform the layer-three forwarding for the data packet.

As mentioned above, the fabric boards in each category may store ARP entries. The fabric board in foregoing category matching with the value may refer to a fabric board, which may store ARP entries meeting the following condition. Value of a set bit position of the destination IP address in the ARP entry is the same as the value of the set bit position of the destination IP address in the data packet. When the set bit position includes 1 bit, if value of the set bit position of the destination IP address in the data packet is an odd number (e.g., the value is 1), take a first-category fabric board as the destination fabric board. If the value of the set bit position of the destination IP address in the data packet is an even number (e.g., the value is 0), take a second-category fabric board as the destination fabric board. When the set bit position includes 2 bits, or M bits, the case is similar, which will not be repeated here.

In an example of the present disclosure, access control list (ACL) entries may be set in the line card, so as to achieve the following operation in block 102. That is, if value of the set bit position of the destination IP address in the data packet matches with fabric boards of a category, take a fabric board of foregoing category as the destination fabric board. The matching condition of an ACL entry may be value of the set bit position in the destination IP address. The action of an ACL entry may refer to selecting a fabric board of which category. Specifically, select a fabric board of foregoing category based on a given method, e.g., the load balancing method.

In block 103, the line card of the layer-three VXLAN gateway may transmit the data packet to the destination fabric board.

In an example of the present disclosure, in block 103, to guarantee that the line card of the layer-three VXLAN gateway to successfully transmit the data packet to the destination fabric board of the layer-three VXLAN gateway, one method is to perform an inner encapsulation to the data packet destined for the destination fabric board. To facilitate descriptions, the inner encapsulation may be referred to as fabric board proxy encapsulation. Subsequently, in block 103, the process for the line card to transmit the data packet to the destination fabric board of the layer-three VXLAN gateway may include the following blocks.

In block a1, perform the fabric board proxy encapsulation to the data packet.

The fabric board proxy encapsulation may include a destination proxy chip identity (chip ID) and a destination proxy port ID (port). The destination proxy chip ID may be the fabric-board proxy chip ID. The destination proxy port may be the fabric-board proxy port ID.

In an example of the present disclosure, the fabric-board proxy chip ID may be pre-configured and may be a chip ID, which indicates the fabric board to continuously search in a table to forward packets. The fabric board proxy port ID may be pre-configured and may be a port ID, which indicates the fabric board to continuously search in a table to forward packets. When there are multiple fabric boards in the layer-three VXLAN gateway, all the fabric boards may be configured with foregoing fabric board proxy chip ID and fabric board proxy port ID.

In block a2, transmit the data packet with fabric board proxy encapsulation to the destination fabric board of the layer-three VXLAN gateway, by using a port connecting the line card with the destination fabric board.

After performing foregoing blocks a1 and a2, the line card of the layer-three VXLAN gateway may finally transmit the data packet to the destination fabric board of the layer-three VXLAN gateway successfully.

In block 104, the destination fabric board of the layer-three VXLAN gateway may receive the data packet from the line card of the layer-three VXLAN gateway, determine to perform the layer-three forwarding to the data packet, search in ARP entries stored by the destination fabric board for an ARP entry matching the destination IP address of the data packet, and cooperate with a first destination line card associated with the output port of the ARP entry searched out, so as to forward the data packet.

Based on the fabric board proxy encapsulation described by foregoing block 103, in block 104, the data packet received by the destination fabric board of the layer-three VXLAN gateway may be a data packet with fabric board proxy encapsulation. Subsequently, in block 104, the process for the destination fabric board of the layer-three VXLAN gateway to determine to perform the layer-three forwarding to the data packet may include as follows.

Determine the destination proxy chip ID and destination proxy port from the fabric board proxy encapsulation header of the received data packet. When the determined destination proxy chip ID is foregoing fabric-board proxy chip ID, and the determined destination proxy port is foregoing fabric board proxy port ID, determine to perform the layer-three forwarding to the data packet, and perform a decapsulation to the fabric board proxy encapsulation of the data packet; otherwise, continuously forward the received data packet based on destination proxy port of the fabric board proxy encapsulation, which is similar to a mode for a fabric board to forward packets, and will not be repeated here.

In an example, an ARP entry may include a destination IP address, a virtual local area network (VLAN) ID, a destination MAC address, a source MAC address, an output port, and so on. Based on contents in the ARP entry, in block 104, the ARP entry matching with the destination IP address of the data packet may be an ARP entry carrying the destination IP address of the data packet.

In an example, in block 104, the process for the destination fabric board of the layer-three VXLAN gateway to cooperate with the first destination line card, which is associated with the output port of the ARP entry searched out, to forward the data packet may include blocks b1 and b2.

In block b1, the destination fabric board of the layer-three VXLAN gateway may replace the source MAC address of the data packet with the MAC address of the layer-three VXLAN gateway, replace the destination MAC address of the data packet with the destination MAC address in the ARP entry searched out, perform an inner encapsulation to the data packet based on type of the output port in the ARP entry searched out, and transmit the data packet with the inner encapsulation to the first destination line card of the layer-three VXLAN gateway, in which the first destination line card is associated with the output port of the ARP entry searched out.

In an example of the present disclosure, in block b1, the process of performing the inner encapsulation to the data packet based on the type of output port of the ARP entry searched out may include the following blocks.

In block c1, identify whether the output port of the ARP entry searched out is a host accessed port, or a network side port. When the output port of the ARP entry searched out is the host accessed port, proceed with block c2. When the output port of the ARP entry searched out is the network side port, proceed with block c3.

In block c2, determine a line card where the host accessed port is located in the layer-three VXLAN gateway to be the first destination line card. Perform a first inner encapsulation to the modified data packet, and transmit the first internal encapsulated data packet to the first destination line card of the layer-three VXLAN gateway.

The first inner encapsulation may include a first destination chip ID and a first destination port. The first destination chip ID may be an ID of a chip for forwarding a packet in the first destination line card. The first destination port may be an output port of the ARP entry searched out.

In block c3, when the network side port is a single physical port, determine that the single physical port is the destination output port. When the network side port is an aggregate port (AGP) constituted by at least two physical ports, take one physical port of the AGP as the destination output port, take the line card where the destination output port is located of the layer-three VXLAN gateway as the first destination line card, perform a second inner encapsulation to the modified data packet, and transmit the second internal encapsulated data packet to the destination line card of the layer-three VXLAN gateway.

The second inner encapsulation may include a second destination chip ID, a second destination port and the VLAN ID of the ARP entry searched out. The second destination chip ID is the line card proxy chip ID. The second destination port is the line card proxy port ID. All of the line cards in the layer-three VXLAN gateway may be configured with foregoing line card proxy chip ID and line card proxy port ID.

In an example, in block c3, there may be various methods for selecting one physical port from the AGP, e.g., select one physical port randomly, or select one physical port with a given selection method, such as hash method, which is not limited by the present disclosure.

In block b2, the first destination line card of the layer-three VXLAN gateway may receive the internal encapsulated data packet, which is transmitted by the destination fabric board of the layer-three VXLAN gateway, and forward the internal decapsulated data packet, based on the inner encapsulation.

Based on contents described in foregoing block b1, that is, how to enable the destination fabric board of the layer-three VXLAN gateway to transmit the data packet to the first destination line card of the layer-three VXLAN gateway, in block b2, the process for the first destination line card of the layer-three VXLAN gateway to forward internal decapsulated data packet based on the inner encapsulation may include blocks d1-d3.

In block d1, when the received data packet carries the first inner encapsulation, proceed with block d2. When the received data packet carries the second inner encapsulation, proceed with block d3.

In block d2, determine the first destination chip ID and the first destination port from the first inner encapsulation header. When the first destination chip ID is an ID of a chip for forwarding a packet in the line card, and the first destination port is an ID of a host accessed port in the line card, perform decapsulation to the received data packet with first inner encapsulation, and forward the decapsulated data packet via the host accessed port corresponding to the first destination port.

In block d3, determine the second destination chip ID and the second destination port from the second inner encapsulation header. When the determined second destination chip ID is the line card proxy chip ID, the determined second destination port is the line card proxy port ID, determine the VLAN ID from the second inner encapsulation header of the data packet, and perform decapsulation to the second inner encapsulation of the data packet. Search in a preconfigured mapping relationship between VLAN ID and VNID for a VNID mapping to the determined VLAN ID. Search in MAC entries stored by the line card for a MAC entry, which matches with the VNID searched out and the destination MAC address of the decapsulated data packet. Search in VXLAN encapsulation entries stored by the line card for a corresponding VXLAN encapsulation entry, based on output port in the MAC entry searched out. Perform VXLAN encapsulation to the decapsulated data packet, based on the VXLAN encapsulation entry searched out and the VNID searched out, and transmit the VXLAN encapsulated data packet through output port in the VXLAN encapsulation entry searched out.

The output port in the MAC entry is the network side port (a VXLAN tunnel port). In an example of the present disclosure, when the output port of the MAC entry is the VXLAN tunnel port, which may be a virtual concept, the VXLAN tunnel port may be demonstrated by a VXLAN tunnel encapsulation index, e.g., the VXLAN tunnel port may be Tunnel 1 (Tunnel 1 is the VXLAN encapsulation index). Subsequently, the process for searching in VXLAN encapsulation entries stored by the line card for a corresponding VXLAN encapsulation entry based on the MAC entry searched out may include as follows. Search in VXLAN encapsulation entries stored by the line card for a corresponding VXLAN encapsulation entry, based on the VXLAN encapsulation index.

The process for performing VXLAN encapsulation to the decapsulated data packet based on the VXLAN encapsulation entry and VNID may include as follows. Perform a VXLAN outer header encapsulation to the decapsulated data packet, based on VXLAN encapsulation information in the VXLAN encapsulation entry searched out. Perform a VXLAN field (VNID field) encapsulation to the decapsulated data packet based on the VNID searched out. The VXLAN outer header may at least include an outer Ethernet (Eth) encapsulation. The outer Eth encapsulation may at least include an outer source MAC address, an outer destination MAC address, an outer source IP address and an outer destination IP address, and so on.

In an example of the present disclosure, the process for transmitting the data packet via output port of the VXLAN encapsulation entry searched out may include as follows. Identify the output port of the VXLAN encapsulation entry searched out. When the output port is a single physical port, transmit the data packet via the single physical port. When the output port is an AGP constituted by at least two physical ports, select one physical port from the AGP, and transmit the data packet via the selected physical port. It should be noted that, select one physical port from the AGP may no longer be random. It may be guaranteed that the finally selected physical port is consistent with the physical port, which is selected by foregoing destination fabric board when determining the first destination line card. There may be various methods, e.g., the destination fabric board may select the physical port based on a hash method, which will not be limited by the present disclosure. The first destination line card may also select the physical port based on the hash method similarly.

Until now, descriptions for the flowchart illustrated with FIG. 1 have been completed.

Based on the flowchart in FIG. 1, it can be seen that in an example of the present disclosure, the ARP entries are separately stored by the fabric board of the layer-three VXLAN gateway. Besides, in addition to storing a small number of routing entries, fabric boards of the layer-three VXLAN gateway may store ARP entries. Subsequently, even if there are a huge number of ARP entries, since there are no other excessive entries to compete hardware resources with ARP entries for maintenance, the defects that there is no sufficient hardware resource to maintain the ARP entries may be avoided. In an example of the present disclosure, no matter receiving a data packet without VXLAN encapsulation, or receiving a data packet with VXLAN encapsulation, the line card of the layer-three VXLAN gateway may determine the destination fabric board in the layer-three VXLAN gateway, based on value of the set bit position of the destination IP address in the data packet, and transmit the data packet to the destination fabric board of the layer-three VXLAN gateway. And then, the destination fabric board may perform layer-three proxy forwarding by using the ARP entries, which may optimize layer-three access functions of the VXLAN gateway. Besides, the whole process may be performed within the layer-three VXLAN gateway, which may not waste any bandwidth resource and may achieve line speed forwarding of packets.

It should be noted that, in foregoing block 103, when the destination fabric board of the layer-three VXLAN gateway does not search out an ARP entry matching with the destination IP address of the data packet, further proceed with following blocks e1 to e3.

In block e1, the destination fabric board of the layer-three VXLAN gateway may search in routing entries stored by the destination fabric board for a routing entry, which matches with the destination IP address of the data packet.

As mentioned above, the fabric board of the layer-three VXLAN gateway may store routing entries. The output port of the routing entry searched out may be the host accessed port of the layer-three VXLAN gateway.

In block e2, the destination fabric board of the layer-three VXLAN gateway may determine the line card, where the output port (the host accessed port of the layer-three VXLAN gateway) is located, of the routing entry searched out to be a second destination line card, replace the source MAC address of the data packet with MAC address of the layer-three VXLAN gateway, replace the destination MAC address of the data packet with the destination MAC address of the routing entry searched out, perform a third inner encapsulation to the modified data packet, and transmit the encapsulated data packet to the second destination line card of the layer-three VXLAN gateway.

The third inner encapsulation may include: a third destination chip ID and a third destination port. The third destination chip ID may be an ID of a chip for forwarding a packet in the second destination line card. The third destination port may be the output port (the host accessed port of the layer-three VXLAN gateway) of the routing entry searched out.

In block e3, the second destination line card of the layer-three VXLAN gateway may receive the data packet, which may be transmitted by the destination fabric board of the layer-three VXLAN gateway, and determine the third destination chip ID and third destination port from the third inner encapsulation header of the data packet. When the third destination chip ID is the ID of the chip for forwarding a packet in the second destination line card, meanwhile the third destination port is the ID of the host accessed port in the second destination line card, the second destination line card of the layer-three VXLAN gateway may perform decapsulation to the third inner encapsulation of the received data packet, and forward the decapsulated data packet through the host accessed port corresponding to the third destination port.

The routing entry-based data packet forwarding may be achieved after performing blocks e1 to e3.

The flowchart illustrated with FIG. 1 will be described in the following with three examples, in which fabric boards of the layer-three VXLAN gateway are divided into two categories. When the fabric boards of the layer-three VXLAN gateway are divided into three categories, the case may be similar, which will not be repeated one by one.

Figure 2:
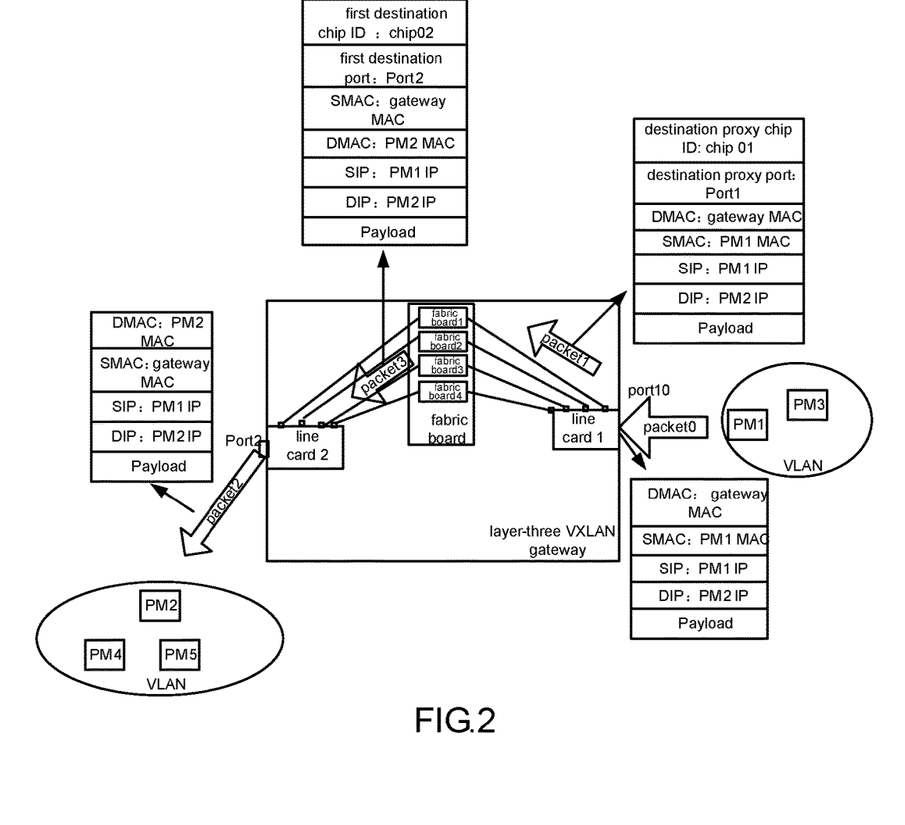
FIG. 2 is a schematic diagram illustrating how to forward a data packet with a layer-three VXLAN gateway, in accordance with an example of the present disclosure.

In the network illustrated with FIG. 2, physical machine 1 (PM1) to PM5 may be devices in a VLAN. In FIG. 2, the layer-three VXLAN gateway may include a master board, a line card and a fabric board. The present disclosure does not focus on the master board, which is not shown in FIG. 2. In the example illustrated with FIG. 2, the layer-three VXLAN gateway may include two line cards (line card 1, line card 2), and four fabric boards (fabric board 1 to fabric board 4).

Line cards 1 and 2 may store MAC entries, VXLAN encapsulation entries and VXLAN decapsulation entries.

Fabric boards 1 and 2 are first-category fabric boards, which may store first-category ARP entries. Fabric boards 3 and 4 are second-category fabric boards, which may store second-category ARP entries. Fabric boards 1 to 4 may also store routing entries.

In the example, PM1 may access PM2. Subsequently, line card 1 of the layer-three VXLAN gateway may receive a packet, which may be transmitted by PM1 in the VLAN via port 10. To facilitate descriptions, the received packet may be referred to as packet 0. Packet 0 received by line card 1 may not carry the VXLAN encapsulation.

Line card 1 may learn that packet 0 is a data packet, and destination MAC address of packet 0 is MAC address of the layer-three VXLAN gateway. And then, line card 1 may identify whether value of the set bit position of the destination IP address in packet 0 is an odd number or an even number. When the value of the set bit position of the destination IP address in packet 0 is an even number, line card 1 may take fabric board 3 or fabric board 4 as the destination fabric board. In the example, line card 1 may take fabric board 3 as the destination fabric board.

Line card 1 may perform a fabric board proxy encapsulation to packet 0. The destination proxy chip ID in the fabric board proxy encapsulation may be the fabric-board proxy chip ID (which may be chip01 in FIG. 2). The destination proxy port in the fabric board proxy encapsulation may be the fabric-board proxy port ID (which may be Port 1 in FIG. 2). To facilitate descriptions, the fabric board proxy encapsulated packet 0 may be referred to as packet 1.

Line card 1 may transmit packet 1 to fabric board 3, by using a port connecting line card 1 with fabric board 3.

After receiving packet 1, fabric board 3 may identify that the destination proxy chip ID and destination proxy port are respectively chip01 and Port 1, by using the fabric board proxy encapsulation header of packet 1, which are respectively the fabric-board proxy chip ID and the fabric-board proxy port ID. And then, fabric board 3 may perform decapsulation (that is, restore foregoing packet 0) to the fabric board proxy encapsulation of packet 1.

Fabric board 3 may search in ARP entries stored therein for an ARP entry matching with the destination IP address of packet 0, replace the source MAC address of packet 0 with MAC address of the layer-three VXLAN gateway, replace the destination MAC address of packet 0 with the destination MAC address (which may be the MAC address of PM2 in FIG. 2) of the ARP entry searched out. To facilitate descriptions, after replacing the source MAC address and the destination MAC address, packet 0 may be referred to as packet 2.

Fabric board 3 may learn that output port of the ARP entry searched out is the host accessed port, determine that the line card, where the host accessed port is located, of the layer-three VXLAN gateway to be the first destination line card. To facilitate descriptions, the first destination line card may be line card 2.

Fabric board 3 may perform the first inner encapsulation to packet 2. To facilitate descriptions, packet 2 with the first inner encapsulation may be referred to as packet 3. The first inner encapsulation may include a first destination chip ID and a first destination port. The first destination chip ID may be an ID of a chip for forwarding packets in line card 2, which may be Chip02. The first destination port may be the ID of the host accessed port, which may be Port 2.

Fabric board 3 may transmit packet 3 to line card 2 via a port, which connects fabric board 3 with line card 2.

Line card 2 may receive packet 3 from fabric board 3, determine the first destination chip ID and first destination port from the first inner encapsulation header of packet 3. When the determined first destination chip ID is ID Chip02 of the chip for forwarding packets in line card 2, and the determined first destination port is the ID Port 2 of the host accessed port in line card 2, line card 2 may perform decapsulation (that is, restore foregoing packet 2) to the first inner encapsulation of packet 3.

Line card 2 may transmit packet 2 via Port 2.

Finally, PM2 may receive the packet from PM1. That is, the data packet forwarding among VLANs may be achieved with the layer-three VXLAN gateway.

Figure 3:
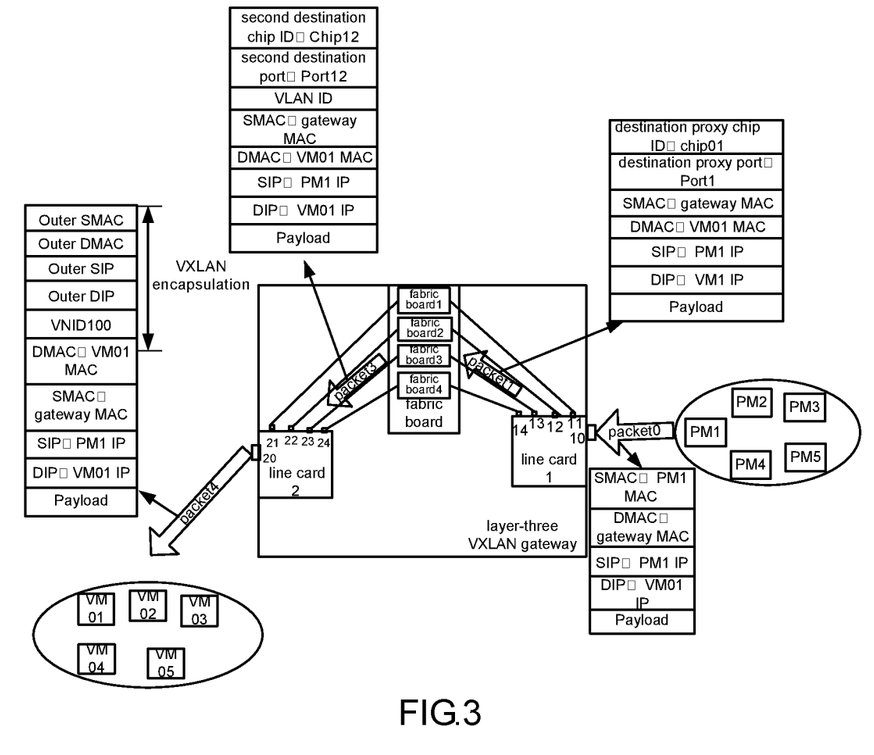
FIG. 3 is a schematic diagram illustrating how to forward a data packet with a layer-three VXLAN gateway, in accordance with another example of the present disclosure.

In the network illustrated with FIG. 3, VM01 to VM05 may be devices in a VXLAN. The VNID of VXLAN may be 100. PM1 to PM5 may be devices in a VLAN. In FIG. 3, the layer-three VXLAN gateway may include a master board, a line card and a fabric board. The present disclosure does not focus on the master board, which is not shown in FIG. 3.

FIG. 3 illustrates two line cards (line cards 1 and 2), and four fabric boards (fabric board 1 to fabric board 4) of the layer-three VXLAN gateway.

Line cards 1 and 2 may store MAC entries, VXLAN encapsulation entries and VXLAN decapsulation entries.

Fabric boards 1 and 2 may be the first-category fabric boards, which may store first-category ARP entries. Fabric boards 3 and 4 may be the second-category fabric boards, which may store second-category ARP entries. Fabric board 1 to fabric board 4 may also store routing entries.

When PM1 accesses VM01, line card 1 of the layer-three VXLAN gateway may receive a packet from PM1 in the VLAN via port 10. To facilitate descriptions, the received packet may be referred to as packet 0. Packet 0 received by line card 1 may not carry the VXLAN encapsulation.

Line card 1 may learn that packet 0 is a data packet, destination MAC address of packet 0 is MAC address of the layer-three VXLAN gateway, and identify whether value of the set bit position of the destination IP address in packet 0 is an odd number or an even number. When identifying that value of the set bit position of the destination IP address in packet 0 is an even number, line card 1 may take fabric board 3 or fabric board 4 as the destination fabric board. In the example of the present disclosure, line card 1 may take fabric board 3 as the destination fabric board.

Line card 1 may perform fabric board proxy encapsulation to packet 0. The destination proxy chip ID in the fabric board proxy encapsulation may be the fabric-board proxy chip ID (which may be chip01 in FIG. 3). The destination proxy port of the fabric board proxy encapsulation may be the fabric-board proxy port ID (which may be Port 1 in FIG. 3). To facilitate descriptions, packet 0 with fabric board proxy encapsulation may be referred to as packet 1.

Line card 1 may transmit packet 1 to fabric board 3 via a port connecting with fabric board 3.

Fabric board 3 may receive packet 1, and identify from the fabric board proxy encapsulation header of packet 1 that the destination proxy chip ID and destination proxy port are respectively chip01 and Port1, which are respectively the fabric-board proxy chip ID and the fabric-board proxy port ID. And then, fabric board 3 may perform decapsulation (that is, restore foregoing packet 0) to the fabric board proxy encapsulation of packet 1.

Fabric board 3 may search in ARP entries stored therein for an ARP entry, which matches with the destination IP address of packet 0, replace source MAC address of packet 0 with MAC address of the layer-three VXLAN gateway, replace destination MAC address of packet 0 with destination MAC address (which may be MAC address of VM01 in FIG. 3) of the ARP entry searched out. To facilitate descriptions, packet 0 with replaced source MAC address and replaced destination MAC address may be referred to as packet 2.

Fabric board 3 may learn that the output port of the ARP entry searched out is the network side port. When the network side port is the single physical port, fabric board 3 may take the single physical port as the destination output port. In the example, the physical port selected may be port 20.

Fabric board 3 may determine the line card, where port 20 is located, of the layer-three VXLAN gateway to be the first destination line card. To facilitate descriptions, the first destination line card may be line card 2.

Fabric board 3 may perform second inner encapsulation to packet 2. To facilitate descriptions, packet 2 with the second inner encapsulation may be referred to as packet 3. The second inner encapsulation may include a second destination chip ID, a second destination port, and the VLAN ID in the ARP entry searched out. The second destination chip ID may be the line card proxy chip ID (which may be Chip12 in FIG. 3). The second destination port may be the line card proxy port ID (which may be Port12 in FIG. 3).

Fabric board 3 may transmit packet 3 to line card 2 via a port connecting with line card 2.

Line card 2 may receive packet 3 from fabric board 3, determine the second destination chip ID and second destination port from the second inner encapsulation header of packet 3. When the determined second destination chip ID is ID Chip12 of proxy chip in line card 2, meanwhile the determined second destination port is ID Port12 of proxy port in line card 2, line card 2 may determine the VLAN ID encapsulated into packet 3 from the second inner encapsulation header of packet 3, and perform decapsulation to the second inner encapsulation of packet 3 (that is, restore foregoing packet 2).

Line card 2 may search out the VNID (VNID 100 of VXLAN) mapping to the determined VLAN ID, based on a pre-configured mapping relationship between VLAN ID and VNID. Line card 2 may also search in MAC entries stored therein for a MAC entry, which matches with the VNID searched out and the destination MAC address of packet 2. And then, line card 2 may search in VXLAN encapsulation entries stored therein for a corresponding VXLAN encapsulation entry, based on output port in the MAC entry searched out. Line card 2 may perform VXLAN encapsulation to packet 2, based on the VXLAN encapsulation entry searched out and the VNID (VNID100 of VXLAN) searched out. To facilitate descriptions, packet 2 with VXLAN encapsulation may be referred to as packet 4. The process for line card 2 to perform VXLAN encapsulation to packet 2, based on the VXLAN encapsulation entry searched out and the VNID searched out may include as follows. Line card 2 may encapsulate a VXLAN outer header for packet 2, by using VXLAN encapsulation information in the VXLAN encapsulation entry searched out, and encapsulate a VXLAN field (e.g., VNID field) for packet 2, based on the VNID (which may be VNID 100 of VXLAN in FIG. 3) searched out. In the example illustrated with FIG. 3, after performing VXLAN encapsulation to packet 2, the VXLAN outer header may include an outer Eth encapsulation. Furthermore, the outer ETH encapsulation may include an outer source MAC address, an outer destination MAC address, an outer source IP address and an outer destination IP address.

Line card 2 may transmit packet 4, by using the output port of the VXLAN encapsulation entry searched out. For example, the process for line card 2 to transmit packet 4 via output port of the VXLAN encapsulation entry searched out may include as follows. Line card 2 may identify the output port of the VXLAN encapsulation entry searched out. The identified output port may be the output port of the ARP entry searched out by fabric board 3. As mentioned above, output port of the ARP entry searched out by fabric board 3 is the single physical port. Subsequently, the identified output port of the VXLAN encapsulation entry searched out may also be the single physical port. Thus, line card 2 may transmit packet 4 via the single physical port.

Finally, VM01 in the VXLAN may receive the packet from PM1. That is, the data packet may be forwarded from VLAN to VXLAN, by using the layer-three VXLAN gateway.

Figure 4:
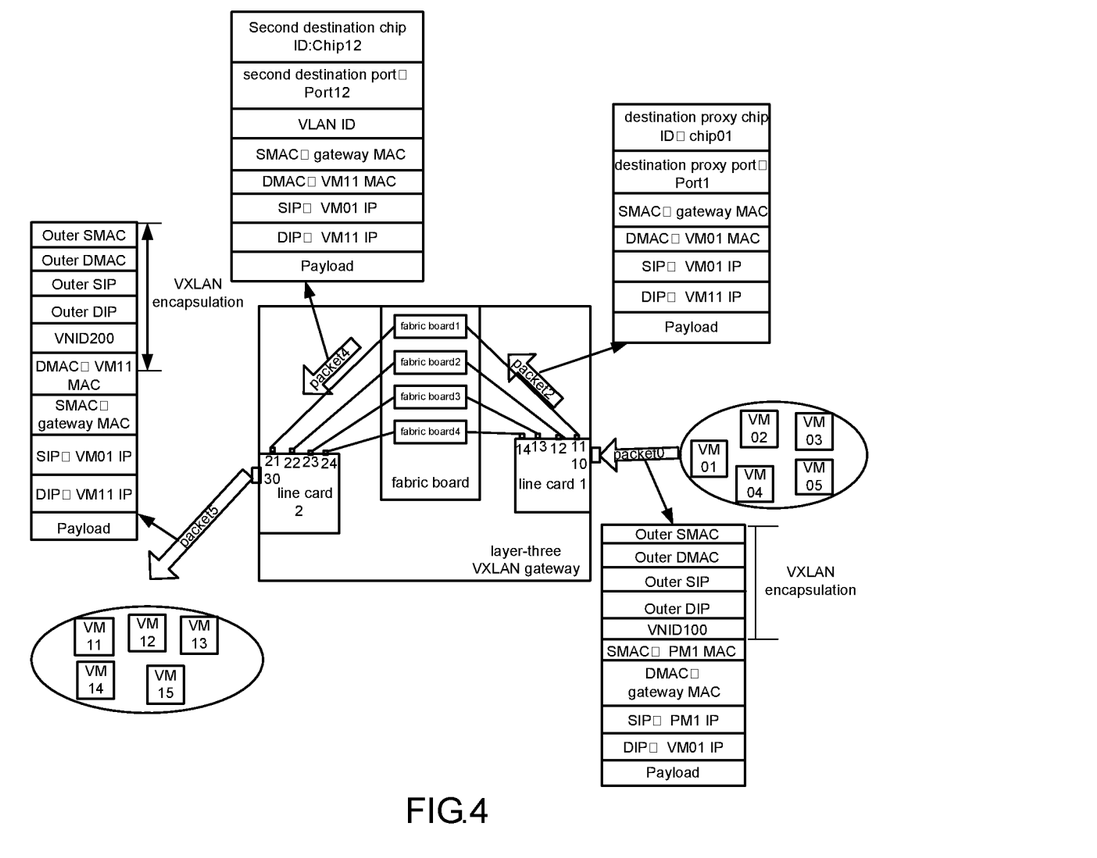
FIG. 4 is a schematic diagram illustrating how to forward a data packet with a layer-three VXLAN gateway, in accordance with still another example of the present disclosure.

In the network illustrated with FIG. 4, VM01 to VM05 may be devices in a first VXLAN. The VNID of the first VXLAN may be 100. VM11 to VM15 may be devices in a second VXLAN. The VNID of the second VXLAN may be

200. In FIG. 4, the layer-three VXLAN gateway between the first VXLAN and the second VXLAN may include a master board, a line card and a fabric board. The present disclosure does not focus on the master board, which is not shown in FIG. 4. In FIG. 4, the layer-three VXLAN gateway may include two line cards (line cards 1 and 2), and four fabric boards (fabric boards 1 to 4).

Line cards 1 and 2 may store MAC entries, VXLAN encapsulation entries and VXLAN decapsulation entries.

Fabric boards 1 and 2 may be the first-category fabric boards, which may store first-category ARP entries. Fabric boards 3 and 4 may be the second-category fabric boards, which may store second-category ARP entries. Fabric boards 1 to 4 may also store routing entries.

In the following example, VM01 may access VM11. Line card 1 of the layer-three VXLAN gateway may receive a packet from VM01 in the first VXLAN. To facilitate descriptions, the received packet may be referred to as packet 0. Packet 0 received by line card 1 may carry VXLAN encapsulation corresponding to the first VXLAN. The VXLAN encapsulation may at least include VNID100 of the first VXLAN, and the VXLAN outer header corresponding to the first VXLAN (the VXLAN outer header of packet 0 shown in FIG. 4 may include an outer Eth encapsulation, which may further include the outer source MAC address, the outer destination MAC address, the outer source IP address and the outer destination IP address). FIG. 4 illustrates the structure of packet 0 with the VXLAN encapsulation.

Line card 1 may determine the outer destination MAC address and VLAN ID from the VXLAN encapsulation header. When a VLAN corresponding to the VLAN ID has been configured for the layer-three VXLAN gateway, and the outer destination MAC address is the layer-three interface MAC address in the layer-three VXLAN gateway corresponding to the VLAN, line card 1 may determine to perform VXLAN decapsulation to packet 0. Line card 1 may search out a corresponding VXLAN decapsulation entry, based on VNID 100 in the VXLAN encapsulation header of packet 0, and perform VXLAN decapsulation to packet 0 based on the VXLAN decapsulation entry searched out. To facilitate descriptions, the VXLAN decapsulated packet 0 may be referred to as packet 1.

Line card 1 may learn that packet 1 is the data packet, and destination MAC address of packet 1 is MAC address of the layer-three VXLAN gateway. Subsequently, line card 1 may identify whether the value in the set bit position of the destination IP address of packet 1 is an odd number or an even number. When the foregoing value is the odd number, line card 1 may take fabric board 1 or fabric board 2 as the destination fabric board. In the example, line card 1 may take fabric board 1 as the destination fabric board.

Line card 1 may perform fabric board proxy encapsulation to packet 1. The destination proxy chip ID in the fabric board proxy encapsulation may be the fabric-board proxy chip ID (which may be chip01 in FIG. 4). The destination proxy port in the fabric board proxy encapsulation may be the fabric-board proxy port ID (which may be Port1 in FIG. 4). To facilitate descriptions, packet 1 with fabric board proxy encapsulation may be referred to as packet 2.

Line card 1 may transmit packet 2 to fabric board 1 via a port connecting with fabric board 1.

Fabric board 1 may receive packet 2, identify that the destination proxy chip ID and destination proxy port are respectively chip01 and Port1, based on the fabric board proxy encapsulation header of packet 2, which are respectively the fabric-board proxy chip ID and the fabric-board proxy port ID. And then, fabric board 1 may perform decapsulation to the fabric board proxy encapsulation of packet 2 (that is, restore forgoing packet 1).

Fabric board 1 may search in ARP entries stored therein for an ARP entry matching with the destination IP address of packet 1, replace source MAC address of packet 1 with MAC address of layer-three VXLAN gateway, replace destination MAC address of packet 1 with destination MAC address in the ARP entry searched out (which may be MAC address of VM11 in FIG. 4). To facilitate descriptions, packet 1 with replaced source MAC address and replaced destination MAC address may be referred to as packet 3.

Fabric board 1 may learn that output port in the ARP entry searched out is the network side port. When the network side port is an AGP constituted by at least two physical ports, fabric board 1 may take one physical port in the AGP as the destination output port, which may be port 30 in the example.

Fabric board 1 may determine that the line card, where port 30 is located, in the layer-three VXLAN gateway is the first destination line card. To facilitate descriptions, the first destination line card in the example may be line card 2.

Fabric board 1 may perform second inner encapsulation to packet 3. To facilitate descriptions, packet 3 with the second inner encapsulation may be referred to as packet 4. The second inner encapsulation may include a second destination chip ID, a second destination port, and the VLAN ID of the ARP entry searched out. The second destination chip ID may be the line card proxy chip ID (which may be Chip12 in FIG. 4). The second destination port may be the line card proxy port ID (which may be Port 12 representing virtual port ID in FIG. 4).

Fabric board 1 may transmit packet 4 to line card 2 via a port connecting with line card 2.

Line card 2 may receive packet 4 from fabric board 1, determine the second destination chip ID and second destination port from the second inner encapsulation header of packet 4. When the determined second destination chip ID is ID Chip12 of the line card proxy chip, and the determined second destination port is ID Port12 of the line card proxy port, line card 2 may determine the VLAN ID encapsulated into packet 4 from the second inner encapsulation header of packet 4, and perform decapsulation to the second inner encapsulation of packet 4 (that is, restore foregoing packet 3).

Line card 2 may search in a pre-configured mapping relationship between VLAN ID and VNID for a VNID (VNID 200 of the second VXLAN) mapping to the determined VLAN ID, search in MAC entries stored by line card 2 for a MAC entry, which matches with destination MAC address of packet 3 and the VNID searched out. Line card 2 may also search in VXLAN encapsulation entries stored therein for a corresponding VXLAN encapsulation entry, based on output port of the MAC entry searched out. And then, line card 2 may perform VXLAN encapsulation to packet 3, by using the VXLAN encapsulation entry searched out and the VNID (VNID200 of the second VXLAN) searched out. To facilitate descriptions, packet 3 with VXLAN encapsulation may be referred to as packet 5. The process for line card 2 to perform VXLAN encapsulation to packet 3, by using the VXLAN encapsulation entry searched out and the VNID searched out, may be as follows. Line card 2 may perform VXLAN outer header encapsulation to packet 3, by using VXLAN encapsulation information in the VXLAN encapsulation entry searched out, and perform VXLAN field (VNID field) encapsulation to packet 3, by using the VNID searched out (VNID200 of the second VXLAN in FIG. 4). In the example illustrated with FIG. 4, after performing VXLAN encapsulation to packet 3, the outer ETH encapsulation in the VXLAN outer header of packet 3 may include an outer source MAC address, an outer destination MAC address, an outer source IP address and an outer destination IP address.

Line card 2 may transmit packet 5 via output port in the VXLAN encapsulation entry searched out. For example, the process for line card 2 to transmit packet 5 via output port in the VXLAN encapsulation entry searched out may be as follows. Line card 2 may identify output port in the VXLAN encapsulation entry searched out. The identified output port may be output port in the ARP entry, which may be searched out by fabric board 1. As mentioned above, the output port in the ARP entry searched out by fabric board 1 may be the AGP, which consists of at least two physical ports. Thus, the identified output port in the VXLAN encapsulation entry may be the AGP. Subsequently, line card 2 may select one physical port from the identified output port, in a manner that the fabric board determines the destination port. Finally, it may be guaranteed that the physical port via which line card 2 transmits packet 5 is consistent with the physical port, which is selected by the fabric board.

Finally, VM11 in the second VXLAN may receive the packet from VM01. That is, the packet forwarding from the first VXLAN to the second VXLAN may be achieved, by using the layer-three VXLAN gateway.

The foregoing has described the method provided by an example of the present disclosure. The following will describe a device, which is provided by an example of the present disclosure.

Figure 5:
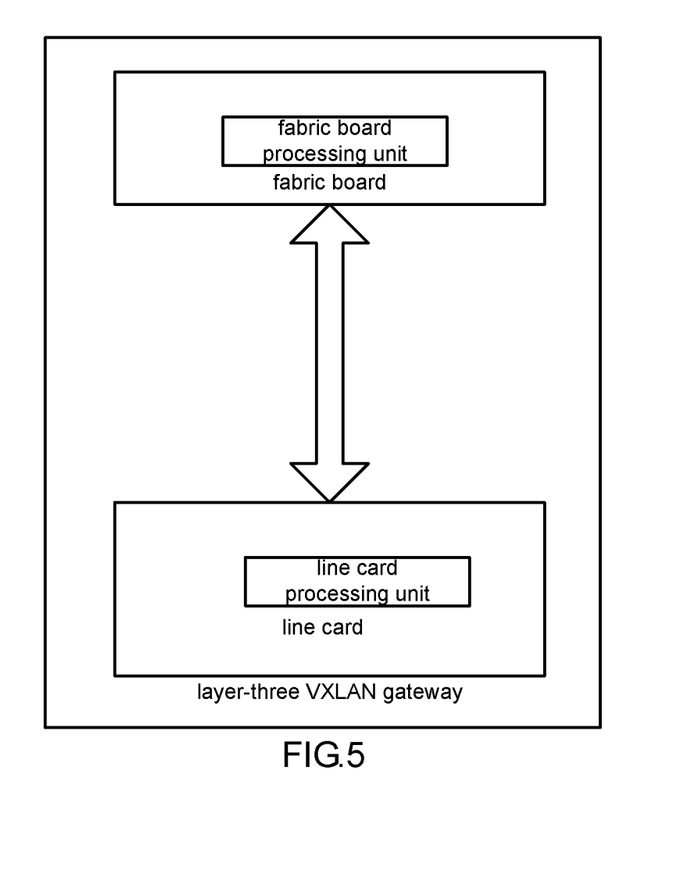
FIG. 5 is a schematic diagram illustrating structure of a device, in accordance with an example of the present disclosure.

With reference to FIG. 5, FIG. 5 is a schematic diagram illustrating structure of a VXLAN gateway, in accordance with an example of the present disclosure. As shown in FIG. 5, the VXLAN gateway may include a line card and a fabric board.

The line card may include a line card processing unit. The line card processing unit may receive a data packet, determine to perform a layer-three forwarding to the data packet, take a fabric board in a category matching with a value in a set bit position of the destination IP address of the data packet as the destination fabric board, and transmit the data packet to the destination fabric board. The fabric board in foregoing category matching with the value may store ARP entries meeting the following conditions. When the value of the set bit position of the destination IP address in the data packet is represented with value A, value of the set bit position of the destination IP address in an ARP entry may be also value A.

When being taking as the first destination line card associated with the output port of the ARP entry searched out by the fabric board, cooperate with the fabric board to forward the data packet.

The fabric board may include a fabric board processing unit. The fabric board processing unit may receive the data packet from the line card of the layer-three VXLAN gateway, determine to perform the layer-three forwarding to the data packet, search in ARP entries stored by the fabric board for an ARP entry matching with the destination IP address of the data packet, and cooperate with the first destination line card associated with the output port of the ARP entry searched out to forward the data packet.

The process for the fabric board processing unit to cooperate with the first destination line card, which is associated with the output port of the ARP entry searched out, so as to forward the data packet may include as follows. Replace the source MAC address of the data packet with MAC address of the layer-three VXLAN gateway. Replace the destination MAC address of the data packet with the destination MAC address of the ARP entry searched out. Perform inner encapsulation to the modified data packet, based on type of the output port in the ARP entry searched out. Transmit the data packet with inner encapsulation to the first destination line card in the layer-three VXLAN gateway, which is associated with the output port in the ARP entry searched out.

When the line card is taken as the first destination line card, which is associated with the output port in the ARP entry searched out by the fabric board, the line card processing unit may cooperate with the fabric board to forward the data packet, the foregoing process may include as follows. Receive the data packet from the destination fabric board in the layer-three VXLAN gateway. Forward the data packet via the output port in the ARP entry, which is searched out by the fabric board processing unit.

The process for the fabric board processing unit to perform the inner encapsulation to the modified data packet, based on type of the output port in the ARP entry searched out, may include as follows.

Identify whether the output port in the ARP entry searched out is the host accessed port, or the network side port.

When identifying that output port in the ARP entry searched out is the host accessed port, determine that the line card where the host accessed port is located in the layer-three VXLAN gateway is the first destination line card. Perform the first inner encapsulation to the modified data packet. Transmit the data packet with the first inner encapsulation to the first destination line card of the layer-three VXLAN gateway. The first inner encapsulation may include a first destination chip ID and a first destination port ID port. The first destination chip ID may be the ID of a chip for forwarding packets in the first destination line card. The first destination port may be the output port in the ARP entry searched out.

When identifying that the output port in the ARP entry searched out is the network side port, if the network side port is the single physical port, determine that the single physical port is the destination output port. When the network side port is the AGP constituted by at least two physical ports, take one physical port in the AGP as the destination output port. Determine that the line card where the destination output port is located in the layer-three VXLAN gateway is the first destination line card. Perform second inner encapsulation to the modified data packet. Transmit the data packet with the second inner encapsulation to the first destination line card of the layer-three VXLAN gateway. The second inner encapsulation may include a second destination chip ID, a second destination port, and VLAN ID in the ARP entry searched out. The second destination chip ID may be the line card proxy chip ID. The second destination port may be the line card proxy port ID.

The process for the line card processing unit to forward the internal decapsulated data packet, based on the inner encapsulation, may include as follows.

When the received data packet carries the first inner encapsulation, determine the first destination chip ID and the first destination port from the first inner encapsulation header. When the first destination chip ID is the ID of the chip for forwarding packets in the line card, and the first destination port is the ID of the host accessed port in the line card, perform decapsulation to the first inner encapsulation of the received data packet, and forward the decapsulated data packet via the host accessed port corresponding to the first destination port.

When the received data packet carries the second inner encapsulation, determine the second destination chip ID and second destination port from the second inner encapsulation header of the received data packet. When the determined second destination chip ID is the line card proxy chip ID, and the determined second destination port is the line card proxy port ID, determine the VLAN ID in the second inner encapsulation header of the data packet, and perform decapsulation to the second inner encapsulation of the data packet. Search in a pre-configured mapping relationship between VLAN ID and VNID for a VNID mapping to the determined VLAN ID. Search in MAC entries of the line card for a MAC entry, which matches with the destination MAC address of the decapsulated data packet and the VNID searched out. Search in VXLAN encapsulation entries of the line card for a corresponding VXLAN encapsulation entry, based on output port in the MAC entry searched out. Perform VXLAN encapsulation to the decapsulated data packet, by using the VXLAN encapsulation entry searched out and the VNID searched out. Transmit the data packet with VXLAN encapsulation via the output port in the VXLAN encapsulation entry searched out.

When the fabric board processing unit does not search out the ARP entry matching with the destination IP address of the data packet, further proceed with the following blocks.

Search in routing entries of the fabric board for a routing entry, which matches with the destination IP address of the data packet. The output port of the routing entry searched out may be the host accessed port.

Determine the line card in the layer-three VXLAN gateway, where output port in the routing entry searched out is located, to be the second destination line card. Replace the source MAC address of the data packet with MAC address of the layer-three VXLAN gateway. Replace the destination MAC address of the data packet with the destination MAC address in the routing entry searched out. Perform third inner encapsulation to the modified data packet, and transmit the encapsulated data packet to the second destination line card of the layer-three VXLAN gateway. The third inner encapsulation may include a third destination chip ID and a third destination port. The third destination chip ID may be the ID of the chip for forwarding packets in the second destination line card. The third destination port may be the output port in the routing entry searched out.

When the line card where the line card processing unit is located is the second destination line card, further receive the data packet from the destination fabric board of the layer-three VXLAN gateway, determine the third destination chip ID and third destination port from the third inner encapsulation header of the data packet. When the determined third destination chip ID is the ID of the chip for forwarding packets in the line card, and the determined third destination port is the ID of the host accessed port in the line card, perform decapsulation to the third inner encapsulation of the received data packet, and forward the decapsulated data packet via the host accessed port corresponding to the third destination port.

The foregoing describes the structure of the device illustrated with FIG. 5.

Figure 6:
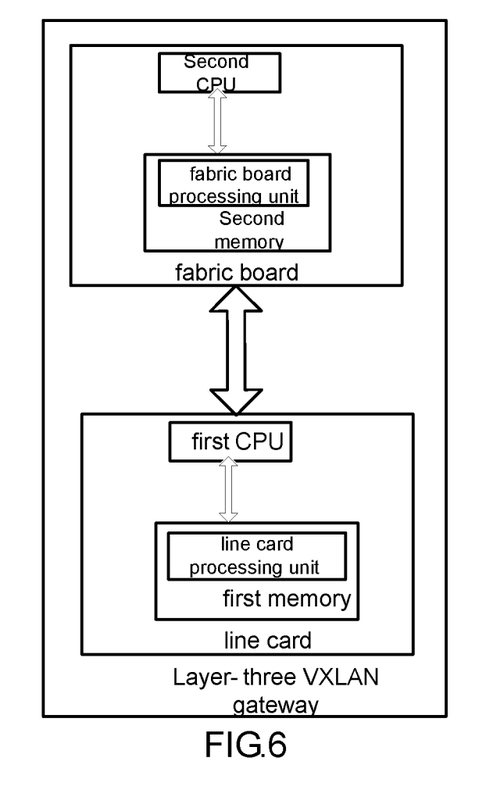
FIG. 6 is a schematic diagram illustrating a hardware structure of the device shown in FIG. 5, in accordance with an example of the present disclosure.

FIG. 6 is a schematic diagram illustrating hardware structure of the VXLAN gateway illustrated with FIG. 5. As shown in FIG. 6, the hardware structure of the VXLAN gateway may include a line card and a fabric board.

The line card may include a first central processing unit (CPU) and a first memory.

The first memory may store a line card processing unit.

The first CPU may store a control program run by the line card processing unit, so as to control the line card processing unit in the first memory to perform foregoing operations. Operations performed by the line card processing unit in the first memory may be the same as operations performed by the line card processing unit in foregoing examples, which will not be repeated here.

The fabric board may include a second CPU and a second memory.

The second memory may store the fabric board processing unit.

The second CPU may store a control program run by the fabric board processing unit, so as to control the fabric board processing unit in the second memory to perform operations. The operations performed by the fabric board processing unit in the second memory may be the same as operations performed by the fabric board processing unit in foregoing examples, which will not be repeated here.

The foregoing describes the hardware structure of the device illustrated with FIG. 6.

The invention claimed is:

1. A method for forwarding a data packet, comprising:
receiving, by a line card of a layer-three virtual extensible local area network (VXLAN) gateway, the data packet;
determining, by the line card of the layer-three VXLAN gateway, to perform a layer-three forwarding to the data packet;
taking, by the line card of the layer-three VXLAN gateway, a fabric board of a category as a destination fabric board, which matches with a value of a set bit position in a destination internal protocol (IP) address of the data packet, wherein fabric boards of the category store address resolution protocol (ARP) entries meeting a condition: a value of a set bit position in a destination IP address of an ARP entry is the same as the value of the set bit position of the destination IP address in the data packet;
transmitting, by the line card of the layer-three VXLAN gateway, the data packet to the destination fabric board, such that the destination fabric board determines to perform the layer-three forwarding to the data packet, searches in ARP entries stored by the destination fabric board for an ARP entry matching with the destination IP address of the data packet, and cooperates with a first destination line card associated with an output port in the ARP entry searched out to forward the data packet, after receiving the data packet from the line card of the layer-three VXLAN gateway.

2. The method according to claim 1, wherein the destination fabric board cooperating with the first destination line card associated with the output port in the ARP entry searched out comprises:
replacing, by the destination fabric board of the layer-three VXLAN gateway, the source media access control (MAC) address of the data packet with the MAC address of the layer-three VXLAN gateway, replacing the destination MAC address of the data packet with the destination MAC address in the ARP entry searched out, performing an inner encapsulation to the data packet modified, based on type of the output port in the ARP entry searched out, transmitting the data packet with first inner encapsulation to the first destination line card in the layer-three VXLAN gateway, wherein the first destination line card is associated with the output port in the ARP entry searched out; and,
receiving, by the first destination line card of the layer-three VXLAN gateway, the data packet with first inner encapsulation from the destination fabric board of the layer-three VXLAN gateway, and forwarding the data packet decapsulated based on the inner encapsulation.

3. The method according to claim 2, wherein performing the inner encapsulation to the modified data packet based on the type of the output port in the ARP entry searched out, comprises:

identifying whether the output port in the ARP entry searched out is a host accessed port or a network side port;

when identifying that the output port in the ARP entry searched out is the host accessed port, determining that the line card where the host accessed port is located in the layer-three VXLAN gateway is the first destination line card, performing the first inner encapsulation to the modified data packet, transmitting the data packet with first inner encapsulation to the first destination line card of the layer-three VXLAN gateway, wherein the first inner encapsulation comprises: a first destination chip identity (ID) and a first destination port ID, the first destination chip ID is an ID of a chip for forwarding packets in the first destination line card, the first destination port ID is an ID of the output port in the ARP entry searched out;

when identifying that the output port in the ARP entry searched out is the network side port, if the network side port is a single physical port, determining that the single physical port is a destination output port; if the network side port is an aggregation port (AGP) constituted by at least two physical ports, taking one physical port in the AGP as the destination output port, determining that the line card where the destination output port is located in the layer-three VXLAN gateway is the first destination line card, performing a second inner encapsulation to the modified data packet, and transmitting the data packet with second inner encapsulation to the destination line card of the layer-three VXLAN gateway, wherein the second inner encapsulation comprises a second destination chip ID, a second destination port, and a virtual local area network (VLAN) ID in the ARP entry searched out, the second destination chip ID is a line card proxy chip ID, and the second destination port is a line card proxy port ID.

4. The method according to claim 2, wherein forwarding the decapsulated data packet based on the inner encapsulation comprises:

when the received data packet carries the first inner encapsulation, determining the first destination chip ID and the first destination port from the first inner encapsulation header, if the first destination chip ID is an ID of a chip for forwarding packets in the line card, and the first destination port is an ID of a host accessed port in the line card, performing decapsulation to the first inner encapsulation of the received data packet, and forwarding the decapsulated data packet via the host accessed port corresponding to the first destination port;

when the received data packet carries a second inner encapsulation, determining a second destination chip ID and a second destination port from a second inner encapsulation header, if the determined second destination chip ID is a line card proxy chip ID, and the determined second destination port is a line card proxy port ID, determining the VLAN ID in the second inner encapsulation header of the data packet, and performing decapsulation to the second inner encapsulation of the data packet, searching in a pre-configured mapping relationship between VLAN ID and VNID for a VNID mapping to the determined VLAN ID, searching in MAC entries of the line card for a MAC entry, which matches with the destination MAC address of the decapsulated data packet and the VNID searched out, searching in VXLAN encapsulation entries of the line card for a corresponding VXLAN encapsulation entry with the output port in the MAC entry searched out, performing VXLAN encapsulation to the decapsulated data packet with the VXLAN encapsulation entry searched out and the VNID searched out, and transmitting the data packet with VXLAN encapsulation via the output port in the VXLAN encapsulation entry searched out.

5. The method according to claim 1, further comprising:

when the destination fabric board of the layer-three VXLAN gateway does not search out the ARP entry matching with the destination IP address of the data packet, searching, by the destination fabric board of the layer-three VXLAN gateway, in routing entries of the destination fabric board for a routing entry matching with the destination IP address of the data packet, wherein the output port of the routing entry searched out is a host accessed port;

determining, by the destination fabric board of the layer-three VXLAN gateway, the line card where the output port in the routing entry searched out is located in the layer-three VXLAN gateway is a second destination line card, replacing the source MAC address of the data packet with the MAC address of the layer-three VXLAN gateway, replacing the destination MAC address of the data packet with the destination MAC address in the routing entry searched out, performing a third inner encapsulation to the modified data packet, and transmitting the data packet with third inner encapsulation to the second destination line card of the layer-three VXLAN gateway, wherein the third inner encapsulation comprises a third destination chip ID and a third destination port, the third destination chip ID is an ID of a chip for forwarding packets in the second destination line card, and the third destination port is the output port in the routing entry searched out;

receiving, by the second destination line card of the layer-three VXLAN gateway, the data packet from the destination fabric board of the layer-three VXLAN gateway, determining the third destination chip ID and the third destination port from a third inner encapsulation header of the data packet, when the third destination chip ID is the ID of the chip for forwarding packets in the second destination line card, and the third destination port is the ID of the host accessed port in the second destination line card, performing decapsulation to the third inner encapsulation of the received data packet, and forwarding the decapsulated data packet via the host accessed port corresponding to the third destination port.

6. A virtual extensible local area network (VXLAN) gateway, comprising a line card and a fabric board, wherein the line card comprises a line card processing unit, the line card processing unit is to receive a data packet, determine to perform a layer-three forwarding to the data packet, take a fabric board of a category as a destination fabric board, which matches with a value of a set bit position in a destination internet protocol (IP) address of the data packet, transmit the data packet to the destination fabric board, wherein fabric boards of the category store address resolution protocol (ARP)

entries meeting a condition: a value of a set bit position in a destination IP address of an ARP entry is the same as the value of the set bit position in the destination IP address of the data packet;

when the line card is taken as a first destination line card associated with an output port in an ARP entry searched out by the fabric board, the line card is to cooperate with the fabric board to forward the data packet;

wherein the fabric board comprises a fabric board processing unit, when the fabric board is taken as the destination fabric board, the fabric board processing unit is to receive the data packet from the line card of the VXLAN gateway, determine to perform the layer-three forwarding to the data packet, search in ARP entries of the fabric board for an ARP entry matching with the destination IP address of the data packet, and cooperate with the first destination line card associated with the output port of the ARP entry searched out to forward the data packet.

7. The VXLAN gateway according to claim 6, wherein when the fabric board is taken as the destination fabric board, the fabric board processing unit in the fabric board is further to replace the source media access control (MAC) address of the data packet with MAC address of the VXLAN gateway, replace the destination MAC address of the data packet with the destination MAC address in the ARP entry searched out, perform an inner encapsulation to the modified data packet based on type of the output port in the ARP entry searched out, transmit the data packet with the inner encapsulation to the first destination line card in the VXLAN gateway, and the first destination line card is associated with the output port in the ARP entry searched out;

when the line card is taken as the first destination line card associated with the output port in the ARP entry searched out by the fabric board, the line card processing unit in the line card is further to receive the data packet from the destination fabric board of the VXLAN gateway, and forward the data packet via the output port in the ARP entry searched out by the fabric board processing unit.

8. The VXLAN gateway according to claim 7, wherein the fabric board processing unit is further to identify whether the output port in the ARP entry searched out is a host accessed port or a network side port;

when identifying that the output port in the ARP entry searched out is the host accessed port, the fabric board processing unit is further to determine that the line card where the host accessed port is located in the VXLAN gateway is the first destination line card, perform a first inner encapsulation to the modified data packet, and transmit the data packet with first inner encapsulation to the first destination line card of the VXLAN gateway, wherein the first inner encapsulation comprises a first destination chip identity (ID) and a first destination port ID (first destination port), the first destination chip ID is an ID of a chip for forwarding packets in the first destination line card, and the first destination port is the output port in the ARP entry searched out;

when identifying that the output port in the ARP entry searched out is the network side port, if the network side port is a single physical port, the fabric board processing unit is further to determine that the single physical port is a destination output port, if the network side port is an aggregation port (AGP) constituted by at least two physical ports, the fabric board processing unit is further to take one physical port in the AGP as the destination output port, determine that the line card where the destination output port is located in the VXLAN gateway is the first destination line card, perform a second inner encapsulation to the modified data packet, transmit the data packet with second inner encapsulation to the destination line card of the VXLAN gateway, wherein the second inner encapsulation comprises a second destination chip ID, a second destination port, and a virtual local area network (VLAN) ID of the ARP entry searched out, the second destination chip ID is a line card proxy chip ID, and the second destination port is a line card proxy port ID.

9. The VXLAN gateway according to claim 7, wherein when the received data packet carries a first inner encapsulation, the line card processing unit is further to determine a first destination chip ID and a first destination port from a first inner encapsulation header, when the first destination chip ID is an ID of a chip for forwarding packets in the line card, and the first destination port is an ID of a host accessed port in the line card, the line card processing unit is further to perform decapsulation to the first inner encapsulation of the data packet received, and forward the decapsulated data packet via the host accessed port corresponding to the first destination port;

when the received data packet carries a second inner encapsulation, the line card processing unit is further to determine a second destination chip ID and a second destination port from a second inner encapsulation header, if the determined second destination chip ID is a line card proxy chip ID, and the determined second destination port is a line card proxy port ID, the line card processing unit is further to determine the virtual local area network (VLAN) ID in the second inner encapsulation header of the data packet, perform decapsulation to the second inner encapsulation of the data packet, search in a pre-configured mapping relationship between VLAN ID and VNID for a VNID mapping to the determined VLAN ID, search in MAC entries of the line card for a MAC entry, which matches with the destination MAC address of the decapsulated data packet and the VNID searched out, search in VXLAN encapsulation entries of the line card for a corresponding VXLAN encapsulation entry, based on the output port in the MAC entry searched out, perform VXLAN encapsulation to the decapsulated data packet with the VXLAN encapsulation entry searched out and the VNID searched out, and transmit the data packet with VXLAN encapsulation via the output port in the VXLAN encapsulation entry searched out.

10. The VXLAN gateway according to claim 6, wherein when the fabric board processing unit does not search out the ARP entry matching with the destination IP address of the data packet, the fabric board processing unit is further to search in routing entries of the fabric board for a routing entry, which matches with the destination IP address of the data packet, and the output port in the routing entry searched out is a host accessed port;

the fabric board processing unit is further to determine the line card in the VXLAN gateway where the output port in the routing entry searched out is located is a second destination line card, replace the source MAC address of the data packet with MAC address of the VXLAN gateway, replace the destination MAC address of the data packet with the destination MAC address of the routing entry searched out, perform a third inner encapsulation to the modified data packet, and transmit the data packet with third inner encapsulation to the second destination line card of the VXLAN gateway, wherein the third inner encapsulation comprises a third destination chip ID and a third destination port, the third destination chip ID is an ID of a chip for forwarding packets in the second destination line card, and the third destination port is the output port in the routing entry searched out;

when the line card is taken as the second destination line card, the line card processing unit is further to receive the data packet from the destination fabric board of the VXLAN gateway, determine the third destination chip ID and the third destination port from a third inner encapsulation header of the data packet, when the third destination chip ID is the ID of the chip for forwarding packets in the line card, and the third destination port is the ID of the host accessed port in the line card, the line card processing unit is further to perform decapsulation to the third inner encapsulation of the received data packet, and transmit the decapsulated data packet via the host accessed port corresponding to the third destination port.

* * * * *